F. T. ROBERTS.
PROCESS OF MAKING TUBES FOR PNEUMATIC TIRES.
APPLICATION FILED JULY 5, 1916.
1,310,436.
Patented July 22, 1919.
3 SHEETS—SHEET 2.
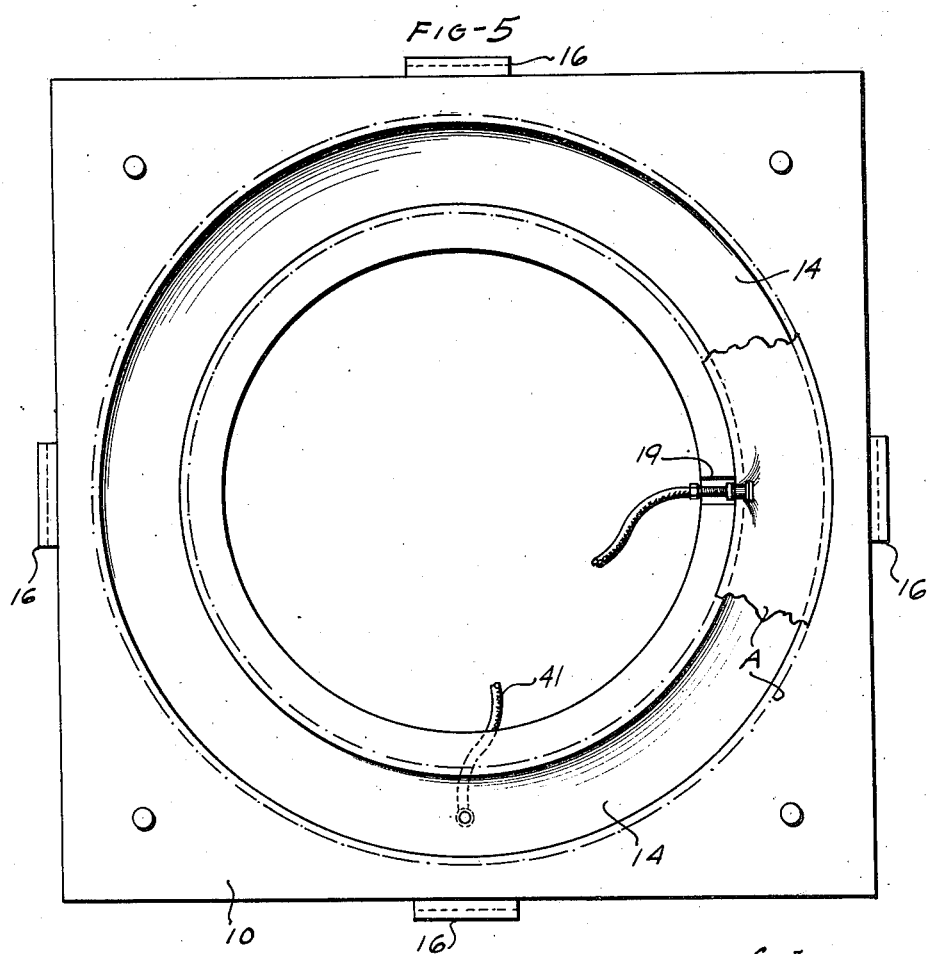
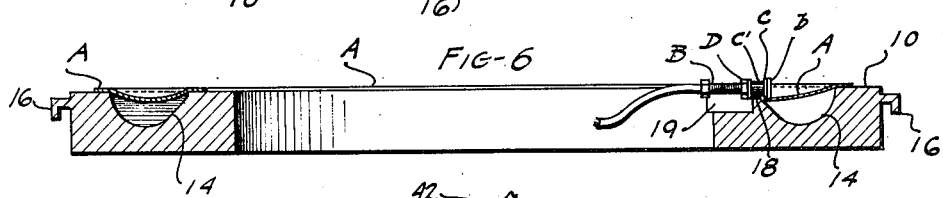
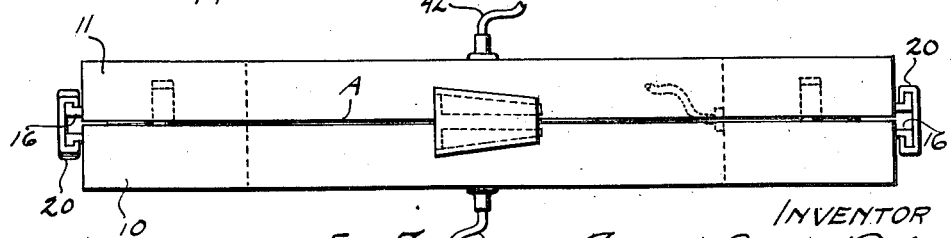

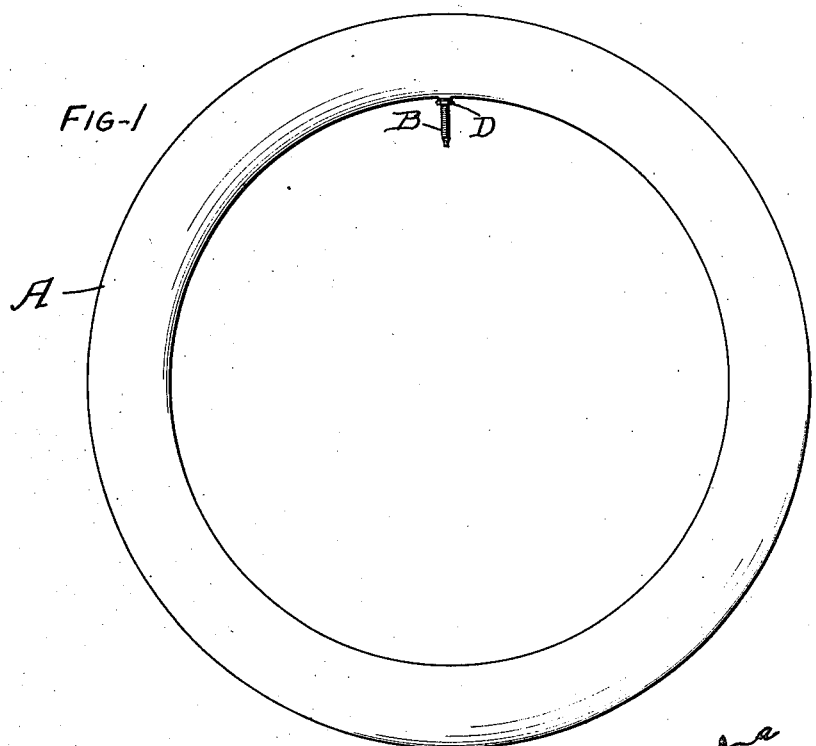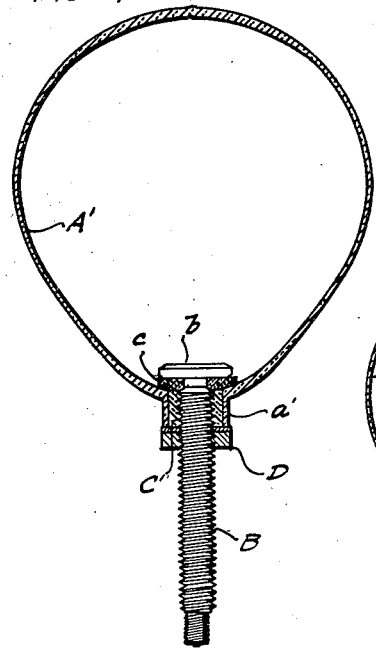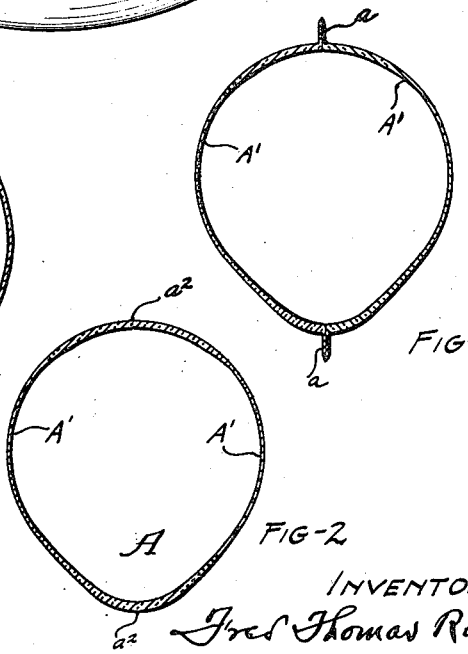

F. T. ROBERTS.
PROCESS OF MAKING TUBES FOR PNEUMATIC TIRES.
APPLICATION FILED JULY 5, 1916.
1,310,436.
Patented July 22, 1919.
3 SHEETS—SHEET 3.
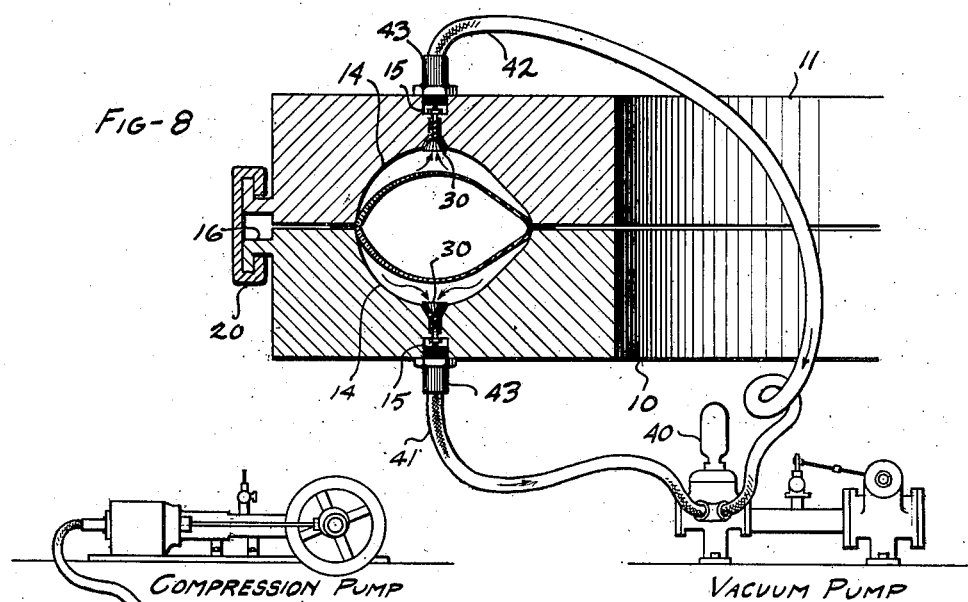
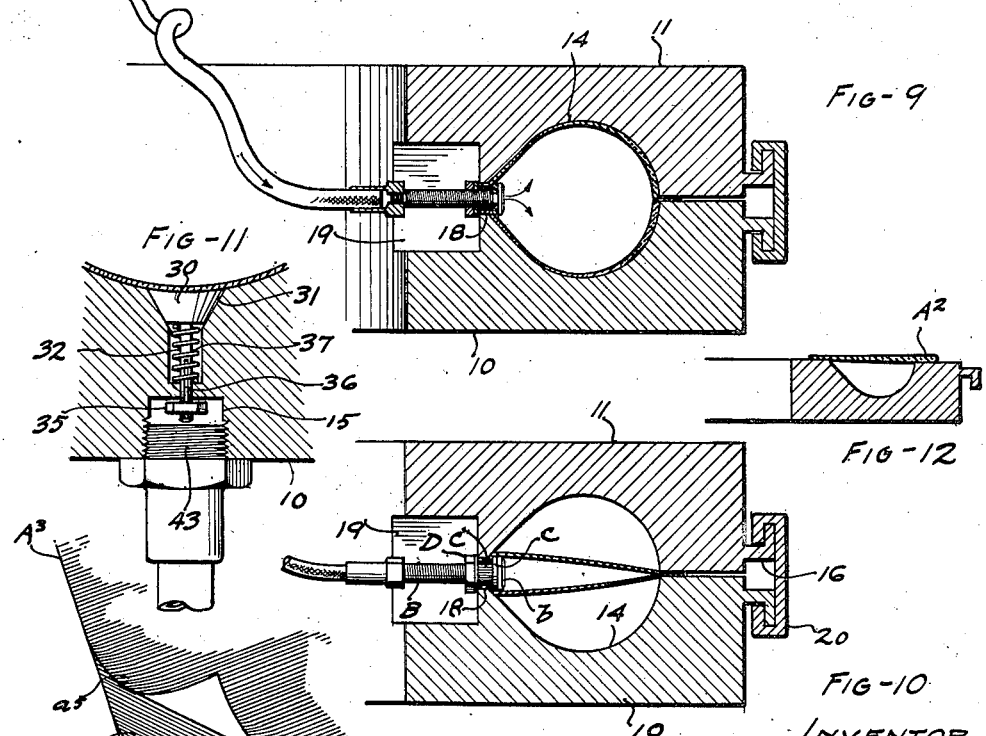

UNITED STATES PATENT OFFICE.

FRED THOMAS ROBERTS, OF CLEVELAND, OHIO, ASSIGNOR TO THE PARAMOUNT RUBBER COMPANY, OF CLEVELAND, OHIO, A CORPORATION OF OHIO.

PROCESS OF MAKING TUBES FOR PNEUMATIC TIRES.

1,310,436.	Specification of Letters Patent.	Patented July 22, 1919.

Application filed July 5, 1916. Serial No. 107,489.

*To all whom it may concern:*

Be it known that I, FRED THOMAS ROBERTS, a citizen of the United States, residing at Cleveland, in the county of Cuyahoga and State of Ohio, have invented a certain new and useful Improvement in Processes of Making Tubes for Pneumatic Tires, of which the following is a full, clear, and exact description, reference being had to the accompanying drawings.

Annular inner tubes for pneumatic tires are usually constructed by first rolling a calendered sheet of raw rubber into a longitudinal tube about a mandrel, in the form of a pole; then curing the tube and withdrawing the mandrel; then cementing a reinforcing patch on the inner side of the tube near one end, making a hole through the patch and tube and inserting a metal valve nipple through such hole and clamping it to the tube; and then overlapping the ends of the tube onto each other, and, by proper hand treatment and chemicals cementing them together, giving the tube the annular form necessary.

The above described method of making tubes is wasteful of rubber and expensive in the amount of labor required, and the tubes produced have a number of disadvantages. Chief among these is the liability of leakage at the valve nipple and at the overlapped cemented joint of the tube, both of which connections are made after the curing of the rubber. Other disadvantages are that the grain of the rubber, resulting from the calendering, is all in one direction, which is that of the length of the tube, rendering the tube liable to tear. The tread portion of the tube is necessarily stretched when it assumes an annular form, and, as the tube is round in cross section, which is not the final form it takes in use, there is other stretching as it adapts itself to the cavity in the casing. The result of these stretchings is to increase the size of the pores in the rubber, resulting frequently in gradual leakage through the tube walls.

I have discovered a process of making inner tubes which overcomes all of the difficulties mentioned, and enables tubes to be cheaply made in complete form when they are vulcanized, requiring no subsequent cementing at joints or at the valve nipple. My process comprises broadly the steps of placing two sheets of rubber across the mouths of two annular grooves in mold members, bringing two of these mold members together with their grooves facing each other, and with a valve nipple interposed between the two rubber sheets, pneumatically forcing the two sheets of rubber into the respective mold cavities, and vulcanizing the tube in this condition. After vulcanization and the removal of the tube, it is only necessary to trim off the flanges at the outer and inner periphery and the tube is complete.

The pneumatic forcing of the rubber sheet into its annular cavity may be effected by a vacuum applied to the cavity or compressed air supplied to the interior of the tube, or both. I prefer to apply a vacuum to the respective cavities before the mold members are brought together, thus drawing the sheets into place and allowing a visible inspection of each half-tube, and of the seating of the valve nipple in one of them, before the mold members are clamped together. After the mold members are clamped together, I prefer to supply compressed air to the interior of the tube through the valve nipple, after which the vacuum is relieved. The interior compressed air holds the rubber tightly against the mold walls during vulcanization. Other preferred features will be hereinafter referred to.

The drawings show an inner tube made by my process and show a suitable apparatus for carrying out the process. Figure 1 is a side elevation of the finished tube; Fig. 2 is a cross section thereof; Fig. 3 is a cross section of the tube as it is removed from the mold and before the flanges have been cut off; Fig. 4 is a cross section, on a somewhat larger scale, of the finished tube, the section being adjacent to the valve nipple; Fig. 5 is a plan of one of the mold members, showing a piece of the rubber sheet in position; Fig. 6 is a cross section of such mold member; Fig. 7 is an edge view of two of the mold members in coacting position; Fig. 8 is a cross section through two of the mold members in coacting position at points where the vacuum connection is applied; Fig. 9 is a cross section through two of the mold members adjacent to the valve nipple, this view showing the rubber seated in the grooves (either by the action of the vacuum or internal compressed air, or both), the article being thus ready for vulcanization; Fig. 10 is a similar cross section showing the position of the rubber sheets at the time the two mold members are brought together when the vacuum is not employed and internal compressed air alone is relied on to seat the rubber; Fig. 11 is an enlarged vertical section of a portion of the mold showing the valve for the vent; Fig. 12 is a fragmentary cross section of a mold member and a piece of rubber stock thicker at the outer edge than the inner, which may be employed, if desired, in place of the parallel-sided stock shown in Fig. 6; Fig. 13 is a view illustrating a piece of composite laminated sheet with the grain extending in different directions, the different portions of the sheet being turned up for clearness of illustration.

Referring first to Figs. 5, 6 and 7,—10 and 11 indicate a pair of plates, each provided with an annular groove 14, and the two together constituting the mold for the rubber tube. These two plates may be practical duplicates of each other, though one is provided with dowel pins, registering with holes in the other. The annular groove 14 in each plate has a form which corresponds to half of the cavity within the tire casing which the tube is to occupy. The tread portion of a tire casing cavity is substantially semi-circular, while the sides or bead portions are nearly flat, thus giving the cavity a pear-shaped cross section. The groove in my mold members preferably corresponds to this pear-shape, so that the outer half of each groove is substantially a quadrant, and the inner half nearly flat, but curved to merge with the quadrant and to aline with the other mold section.

When the mold members are placed together, face to face, to inclose a space corresponding to the shape the annular tube is to have, they are held together by suitable means. For this purpose I have shown on each mold member an inclined rib 16, which is adapted to be engaged by a wedge-shaped stirrup 20. The ribs are of a hooked form, as shown, and the stirrup overhangs these hooks, so that when the stirrups are driven into place they interlock with the mold members, holding the mold members together and at the same time retaining themselves in place.

The annular groove of each mold member is provided with a suitable vent which may also furnish connection for the application of a vacuum. Suitable means may be provided for closing this vent when the article is being vulcanized, so as to prevent distortion of the rubber at such point. A valved vent for this purpose is illustrated in Fig. 8, this view also illustrating the connection to the vacuum pump.

As shown in Figs. 8 and 11, 30 indicates a suitable plug having a conical head 31 adapted to seat in a corresponding recess in the base of the groove 14. Extending outwardly from this head is a smaller shank 32, which extends to the outer side of the mold member and preferably has a threaded exterior on which engages a nut 35, whereby the plug may be firmly drawn to its seat. A groove or passage way 36 is made in the shank of the plug and a light spring 37 is shown as surrounding this shank and pressing the plug inwardly. This construction keeps the vent open until a proper vacuum has been obtained therein, beneath the rubber sheet, or proper air pressure above the sheet, whereupon the valve is forced to its seat. When the tube is ready for vulcanizing the nut 35 is tightened to lock the plug head firmly in its conical seat. In this position the face of the head is flush with the adjacent portion of the groove.

In Fig. 8 I have indicated diagrammatically at 40 a vacuum pump and at 41 and 42 pipes leading therefrom to the two mold members. It is to be understood that these pipes are flexible or otherwise allow the mold members to be moved while the vacuum is applied and maintained. I have shown each pipe as connected by a screw-threaded sleeve portion 43 with a recess 15 in the mold member into which the plug shank 32 extends.

In Fig. 6 I have shown at A an annular sheet of rubber lying across the mold cavity 14, this sheet being indicated by the broken lines in Fig. 5. If I employ the vacuum to draw this sheet in the cavity, I prefer to cement the edges of the sheet to the face of the mold, then to apply the vacuum which draws the intermediate portion of the sheet down into the mold snugly against the wall thereof. The same treatment is given to the other mold section 11. This gives the sheet the shape and position shown in Figs. 8 and 9.

Each of the mold sections is formed with a radial inwardly extending groove or channel 18, communicating with the annular groove near its edge. This channel is semi-circular in cross section and of a somewhat greater radius than that of the valve nipple here employed. After the rubber sheet has been placed across the cavity, and preferably after it has been drawn into the cavity by the vacuum, I place the valve nipple in this radial channel. The valve nipple is shown, for example, in Fig. 4, at B. It has an inner head b. Around the shank of the nipple and adjacent this head I place a rubber washer C, and around the shank and adjacent to the washer I place a short rubber tube C'. The portion of the annular rubber sheet lying on the face of the cavity where it crosses the channel 18 forms a short tubular flange about the nipple, as shown in Fig. 4 at $a'$.

When the mold section 11 carrying a sheet of rubber, is placed over the mold section 10, the two flanges of the rubber which lie on the faces of the mold snugly engage each other and make a tight connection, and a tight connection is likewise formed about the valve nipple. The mold sections are then clamped together by driving up the wedge-shaped stirrup 20, described. To increase the firmness of holding the valve nipple, a nut D thereon is now screwed up against inner edges of the ring-like mold plates 10 and 11. A recess 19 is formed in the inner periphery of the mold rings with its base close to the edge of the mold groove 14, so that this nut D as it screws up against the mold may be in substantially the position which the clamping nut has on the usual tire, and I leave this nut on the nipple after vulcanization to keep the rubber packing compressed and prevent displacement of the nipple. With the parts firmly clamped together, compressed air from a suitable pump is admitted through the valve nipple.

As above stated, I prefer to apply vacuum to each of the mold sections before these sections are brought together, this vacuum being applied after the rubber sheet is cemented to the face of the mold member. This vacuum gives each sheet its final form, while the interior is radially visible for ready inspection. At the same time, I can effectively connect the nipple to the rubber which lies in its final shape at that point.

While the employment of the vacuum is preferred, it may be possible to dispense with it, simply placing the rubber sheets across the mold cavities, putting the valve nipple in place, clamping the mold sections together, and forcing the rubber to its walls by compressed air admitted through the valve nipple. Such method, which is illustrated in Fig. 10, would be cheaper, but does not allow the visible inspection of the interior. Both these methods are intended to be included in the broad scope of my invention claimed herein.

Whether the vacuum be employed or not, in primarily forming the rubber to the cavities, it is unnecessary to continue the vacuum after compressed air is supplied to the interior. Accordingly, with the mold sections clamped together and compressed air supplied to the interior of the tube, such air being held by the ordinary valve in the nipple or an additional cap on the nipple, the mold may be transferred bodily to a suitable vulcanizer and the inclosed tube vulcanized in the usual manner.

After vulcanization the nipple nut is slightly unscrewed, the mold opened and the tube removed and the nut tightened to clamp the nipple packing. The tube now has the form shown in Fig. 3, where A' represents the two sheets of rubber, and $a$ the flanges secured together. These flanges are then cut off adjacent to the outer surface of the tube, as illustrated at $a^2$, and the tube A is finished as shown in Figs. 1 and 2.

It will be seen that by my process a valved annular tube is provided which has no cemented joints, all seams being connected by vulcanization. I have accordingly eliminated the main disadvantages of the present tubes in the leakage at the cemented joints of the tube itself and the clamped joint about the valve nipple.

The pneumatic action in forcing the rubber stock into the mold cavity is to stretch the center portion most, so that as the whole body gradually sinks into the cavity, the intermediate portion seems to stretch laterally while remaining approximately parallel with the face of the groove until the sheet is firmly seated. The result of this is that the rubber first bends inwardly immediately adjacent to the edges of the groove at substantially the original thickness of the sheet, and the clinging to the sides of the groove at this point prevents the rubber materially stretching at these edges, and the stretching into the cavity practically begins some distance down in the groove. Accordingly, the rubber is considerably thicker adjacent to the edges of the groove than at the bottom of the groove. The outermost edge of the two grooves are the parts which form the tread portion, and the thickening at this point is particularly desirable, as it gives a reinforced tread to the tube. That is to say, the tube is materially thicker on the tread portion where the greatest wear comes and where there is most liability to puncture. If a greater increase of thickness at the tread is desired, this can be readily accomplished in my process by using rubber stock which is thicker at the outer edge than at the inner, as illustrated at $A^2$ in Fig. 12.

It should be further noted that my tube when constructed has nearly the actual size it is to have when used in the casing. Accordingly the tread portion is only slightly stretched when put in place. On the other hand, the ordinary tube, in order that it shall not buckle on the inner periphery, is made of such size with reference to the casing with which it is to be used that the inner periphery lies substantially true before final inflation, and the outer periphery is considerably stretched during such inflation. This stretching makes the tube more readily susceptible to puncture. My tube, therefore, reduces the probability of puncture, in two ways—by thickening the tread and by substantially obviating internal tension on the tread.

The feature above referred to—that my tube is made to size instead of stretched into shape—has a further advantage in that the pores of the rubber are not opened by stretching. With the ordinary tube the pores in that portion of the longitudinal tube which come onto the outer periphery when it is made annular, are necessarily enlarged by the stretching around the outer periphery, and this enlargement is increased when the tube is pumped into final shape in the casing. Accordingly, the leakage from this source is much greater in an ordinary tube than in one made according to my process.

The rubber sheet from which my tube is made may conveniently be laminated, several thin sheets with the grain extending in different directions being pressed onto each other. In this way the strength of the structure is increased and liability to tear removed. Such a composite sheet is illustrated in Fig. 13, where $a^3$, $a^4$ and $a^5$ represents the grain of three original sheets pressed into one composite sheet $A^3$.

Another advantage of my process is that of cheapness. The ordinary inner tube made straight and then connected into an annular form, must necessarily have a considerable excess of rubber on the inner side of the annulus, in order to have sufficient rubber on the outer portion. My process saves this excess on the inner portion. I save also the cost of the wrapping clothes used in vulcanizing the straight tube, and I effect a material saving in labor, as I do away with the comparatively slow hand work of cementing the overlapped ends, and I reduce the time required for reinforcing and securing the valve nipple.

In my process the waste of material is very slight. The trimmings of the original annular rubber sheet, being of raw rubber, can be used without loss; and the flanges which extend between the mold members may be largely removed by the heating starts in vulcanizing, before they have been materially vulcanized, so that they are still utilizable. The flange which is left on the tube at the end of vulcanization is trimmed off, and even this has a value for reclaiming.

Having thus described my invention, what I claim is:

1. A process of the character described consisting of drawing plastic stock by a vacuum into mold cavities, bringing the parts of such stock together upon an interposed nipple, supplying compressed fluid to the interior of the closed article through such nipple, and curing the article while such supplied internal pressure is maintained.

2. The process of making hollow rubber articles consisting of placing sheets of rubber stock across the mouths of mold cavities, forming sections of the article in finished shape by pneumatically forcing the stock therefor against the walls of the cavities, bringing the mold members substantially together to press the edge portions of one sheet against the other, a nipple being interposed between the sheets, supplying compressed fluid to the interior of the article through such nipple whereby the article is effectively held against the walls of the mold cavities, vulcanizing the article without opening the mold and while the nipple is in place and internal fluid pressure is maintained.

3. The process of making annular tubes of rubber, consisting of clamping two sheets of rubber stock across annular mold cavities and upon an interposed valve nipple, supplying fluid through said nipple to the space between the sheets while causing the air to issue from the cavities, whereby the sheets become pneumatically seated in their respective cavities, and vulcanizing the parts and the nipple together.

4. The process of making annular tubes for pneumatic tires consisting of placing two annular sheets of raw rubber across the mouths of annular mold cavities and upon on interposed radially extending valve nipple, applying suction to the cavities, supplying compressed air to the interior of the article through such nipple, and vulcanizing the article while such internal pressure is maintained.

5. The process of making tubes for pneumatic tires, consisting of taking two sheets of rubber, placing them across the mouths of annular mold cavities, bringing said cavities together face to face thus bringing the edges of the rubber sheets into contact, a valve nipple being placed so as to be embraced by such edges, pneumatically forcing the rubber into the respective cavities, and pneumatically holding it there, and vulcanizing the tube in the same mold while it is thus held against the cavity walls.

6. The process of making tubes for pneumatic tires, consisting of placing two sheets of stock across the mouths of annular grooves in mold members, placing a nipple across the inner edge of one of the sheets, bringing the two mold members together to bring the two edges of the rubber stock into contact, pneumatically forcing the stock into the respective grooves, and vulcanizing the sections together while the stock is seated in these grooves.

7. The process of making tubes for pneumatic tires, consisting of placing two sheets of rubber stock across the mouths of two annular grooves formed in two mold members respectively, each groove having a radial channel leading inwardly from it and having a vent, placing a valve nipple in one of said channels, bringing the mold members together to cause the rubber sheets to engage each other at the edges of the cavities and about the nipple, clamping the mold sections together, establishing a superior internal pressure between the two rubber sheets, the air in the grooves issuing therefrom, closing the vents and vulcanizing the article while in the same mold sections and while the rubber is held against the walls of the cavities by pneumatic means.

8. The process for making tubes for pneumatic tires, consisting of placing two sheets of rubber stock across the mouths of two annular grooves formed in two members respectively, each groove having a venting opening from it, placing a valve nipple between the sheets of stock, bringing the mold members together to cause the rubber sheets to engage each other at the edges of the cavities and about the nipple clamping the mold sections together, closing the vents, and vulcanizing the article while in the same mold sections and while the rubber is held against the walls of the cavities by pneumatic means.

9. The process of making tubes for pneumatic tires, consisting of placing two sheets of rubber across the mouths of two annular grooves in separable mold members, causing each sheet to seat in its groove by reason of the pneumatic pressure therein being less than that on the opposite side of the sheet, bringing the two mold members together and clamping the two sheets of rubber upon each other and upon an interposed valve nipple, forcing air into the interior of the annular tube through said nipple, and vulcanizing the tube while so held against the mold walls.

10. The process of making pneumatic tubes for tires, consisting of placing two sheets of rubber across the mouths of annular grooves in mold members, applying a vacuum to such grooves to draw the stock into the grooves respectively, bringing the two mold members together to clamp the edges of the stock together and onto an interposed valve nipple, and vulcanizing the parts while in the same mold.

11. The process of making pneumatic tubes for tires, consisting of placing two sheets of rubber across the mouths of annular grooves in mold members, applying a vacuum to such grooves to draw the stock into the grooves respectively, bringing the two mold members together to clamp the edges of the stock together and onto an interposed valve nipple, supplying compressed air to the interior of the tube through the valve nipple, relieving the vacuum, and vulcanizing the parts in the same mold.

12. The process of making pneumatic tubes for tires, consisting of placing two sheets of rubber stock across the mouths of annular grooves in mold members, securing the stock to such mold members, applying a vacuum to the grooves to draw the stock into the grooves respectively, placing a valve nipple in engagement with the inner portion of one of the pieces of stock, bringing the two mold members together to clamp the edges of the stock onto each other and about the valve nipple, and vulcanizing the tube while in the same mold.

13. The process of making tubes for pneumatic tires, consisting of placing two flat sheets of stock across the mouths of annular grooves in mold members, placing a headed nipple across the inner edge of one of the sheets, bringing the two mold members together to bringing the two edges of the rubber stock into contact to hold the sheets taut, drawing the nipple outwardly to make a tight engagement of its head with the inner face of the rubber stock, and positively holding it in this position pneumatically forcing the stock to its seats in the respective grooves, and vulcanizing the parts together while the stock and nipple are so held.

14. The process of making pneumatic tires, consisting of placing two sheets of rubber stock across the mouths of annular grooves in mold members, securing the stock to such mold members, applying a vacuum to the grooves to draw the stock into the grooves respectively, placing a valve nipple in engagement with the inner portion of one of the pieces of stock, bringing the two mold members together to clamp the edges of the stock onto each other and about the valve nipple, supplying compressed fluid to the interior of the tube through the valve nipple, and vulcanizing the tube with this compressed fluid within it.

15. The process of making inner tubes for pneumatic tires, consisting of placing two annular sheets of rubber across the mouths of two annular grooves in mold members, each groove having a radial channel communicating with its inner edge, placing a valve nipple in one of said radial channels against the flange of the rubber stock lying therein, bringing the two mold members together face to face to cause the rubber flanges to engage each other and to embrace the valve nipple, forcing fluid under pressure through the valve nipple into the interior of the tube, while venting the grooves, closing such vents and vulcanizing the tube in the same mold with the internal pressure within it, thereafter opening the mold, and trimming off the joined flanges.

16. The process of making inner tubes for pneumatic tires, consisting of securing two annular sheets of rubber across the mouths of two annular grooves in mold members, each groove having a radial channel communicating with its inner edge, placing a valve nipple in said radial channel against the flange of the rubber stock lying therein, drawing the rubber stock into the cavities by means of a vacuum applied to the cavities, bringing the two mold members together face to face to cause the rubber flanges to engage each other and to embrace the valve nipple, forcing fluid under pressure through the valve nipple into the interior of the tube, relieving the vacuum, and vulcanizing the tube in the same mold with the internal pressure within it, thereafter relieving the internal pressure, opening the mold, and trimming off the joined flanges.

17. The process of making inner tubes for pneumatic tires, consisting of taking two mold members, each having an annular groove with a radial channel communicating with its inner edge, placing two sheets of rubber stock across the mouths of such grooves respectively, taking a valve nipple having a head, placing a rubber sleeve on the nipple shank, placing such sleeved nipple in one of the channels in position to cause the sleeve to lie in the channels and the head in the grooves when they meet, bringing the mold members together to cause the rubber stock to embrace the nipple sleeve, and the edges of the stock to come together, clamping the mold members in this position, forming the rubber by pneumatically forcing it against the walls of the respective cavities and holding it there, and thereafter vulcanizing the tube.

18. The process of making annular tubes for pneumatic tires consisting of placing two flat annular sheets of raw rubber across the mouths of annular mold cavities and upon an interposed radially extending nipple, the sheets being held taut, externally clamping the projecting nipple in place, supplying compressed air to the interior of the article through such nipple to form the article, vulcanizing the article in the same mold, removing it from the mold, and trimming off the flanges.

19. The process of making tubes for pneumatic tires consisting of placing raw rubber stock across the mouths of annular mold cavities, drawing the same into such cavities by means of a vacuum, bringing such sheets together edge to edge upon an interposed valve nipple, clamping the valve nipple to the mold members, supplying compressed air to the interior through such valve nipple, relieving the vacuum, and vulcanizing the article while so held.

20. The process of making annular tubes for pneumatic tires consisting of placing two sheets of rubber stock across the mouths of two annular mold cavities, placing on a tubular nipple an external short rubber sleeve, bringing the mold members together upon such interposed nipple in a manner to clamp the nipple between the rubber sheets with its rubber sleeve in engagement with the rubber sheets and to clamp the sheets to each, the sheets being caused to seat in the cavities, and vulcanizing the tube while the sheets are seated in the cavities and the nipple is in place.

21. The process of making annular tubes for pneumatic tires consisting of placing two sheets of raw rubber stock across the mouths of two annular mold cavities, placing on a headed valve nipple a rubber washer and an external short rubber sleeve, bringing the mold members together upon such interposed nipple in a manner to clamp the nipple between the rubber sheets with its head and washer on the inner side thereof and its sleeve in engagement with the rubber sheets and to clamp the edges of the sheets to each, forcing compressed air into the interior of the tube through the nipple, and vulcanizing the tube while the sheets are seated in the cavities and the nipple is in place.

22. The process of making hollow rubber articles which have an inflating nipple consisting of drawing the rubber stock into mold cavities by means of a vacuum, maintaining it therein by means of internal compressed fluid supplied through the nipple, and vulcanizing it with the compressed fluid within it.

23. The process of making annular tire tubes having a thickened tread portion, consisting of placing across the mouths of annular mold cavities respectively two sheets of stock which are thicker adjacent to the outer edge than adjacent to the inner, bringing such two sheets together adjacent to their edges and causing the intermediate portions of the sheets to seat in the mold cavities, and uniting the parts.

24. The process of making annular tire tubes having a thickened tread portion, consisting of placing across the mouths of annular mold cavities two sheets of rubber stock which are thicker adjacent to the outer edge than adjacent to the inner, pneumatically forcing the intermediate portion of the sheets into the mold cavities, and vulcanizing the parts together while the sheets are held in the cavities.

25. The process of making annular tubes for pneumatic tires consisting of placing in contact with each other a plurality of sheets of rubber with the grain extending in different directions, placing two of such composite sheets across the mouths of annular mold cavities, bringing the two composite sheets into contact at the edge of the cavities, causing the intermediate portions of the composite sheets to seat in the respective cavities, and uniting the parts.

26. The process of making annular tubes for pneumatic tires consisting of placing in contact with each other a plurality of sheets of raw rubber with the grain extending in different directions, placing two of such composite sheets across the mouths of annular mold cavities, bringing the two composite sheets into contact at the edges of the cavities, pneumatically forcing the intermediate portions of the composite sheets into the respective cavities, and vulcanizing the parts while in this condition.

27. The process of making annular rubber tubes without transverse seams, consisting of placing two endless annular substantially flat sheets of rubber stock across the mouths of annular mold cavities, giving each annular sheet a half-tube form by pneumatically forcing such sheet against the wall of the corresponding cavity, and vulcanizing two of such formed sheets together.

28. The process of making annular rubber inner tire tubes without transverse seams, consisting of placing two substantially flat sheets of rubber stock across the mouths of annular mold cavities, giving each sheet a half-tire form by pneumatically forcing such sheets against the walls of said cavities, and vulcanizing two of such formed sheets together while they are retained in the same cavities.

29. The process of making inner tubes for pneumatic tires, consisting of placing raw rubber stock for two parts of the tubes across the mouths of annular mold cavities which have a contour corresponding to the finished tube, forming two sections of the tube in finished shape by pneumatically forcing such stock against the walls of the cavities, and thereafter vulcanizing such two formed parts together.

30. The process of making inner tubes for pneumatic tires consisting of placing stock for parts of the tube across the mouths of annular mold cavities which have a contour corresponding to the finished tube and are provided with vents, forming sections of the tube in finished shape by pneumatically forcing such stock against the walls of the cavities, the air in the cavities passing out through the vents, and thereafter closing the vents and vulcanizing such formed parts together while in the same cavities and while the pressure within the article exceeds that immediately outside the article.

31. The process of making annular rubber tubes without transverse seams, consisting of placing two continuous sheets of rubber stock across the mouths of annular mold cavities, giving an annular zone of each sheet a half-tube form by pneumatically forcing such zone against the wall of the corresponding cavity, and vulcanizing two of such forced sheets together.

In testimony whereof, I hereunto affix my signature.

FRED THOMAS ROBERTS.